US011869199B2

(12) United States Patent
Tsuji et al.

(10) Patent No.: US 11,869,199 B2
(45) Date of Patent: Jan. 9, 2024

(54) OBJECT TRACKING DEVICE AND OBJECT TRACKING METHOD

(71) Applicant: OMRON Corporation, Kyoto (JP)

(72) Inventors: Ayana Tsuji, Kyoto (JP); Kiyoaki Tanaka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 185 days.

(21) Appl. No.: 17/434,953

(22) PCT Filed: Feb. 27, 2020

(86) PCT No.: PCT/JP2020/008147
§ 371 (c)(1),
(2) Date: Aug. 30, 2021

(87) PCT Pub. No.: WO2020/184207
PCT Pub. Date: Sep. 17, 2020

(65) Prior Publication Data
US 2022/0172374 A1    Jun. 2, 2022

(30) Foreign Application Priority Data

Mar. 11, 2019 (JP) ................................ 2019-043759

(51) Int. Cl.
*G06T 7/207* (2017.01)
*G06T 7/70* (2017.01)
(Continued)

(52) U.S. Cl.
CPC ............ *G06T 7/207* (2017.01); *G06T 3/0018* (2013.01); *G06T 5/006* (2013.01); *G06T 7/70* (2017.01);
(Continued)

(58) Field of Classification Search
CPC .............. G06T 5/006; G06T 3/0018; G06T 2207/10016; G06T 7/70; G06T 7/20;
(Continued)

(56) References Cited

U.S. PATENT DOCUMENTS

| 2013/0002712 A1* | 1/2013 | Fujii | H04N 5/2628 |
| | | | 345/620 |
| 2014/0193034 A1* | 7/2014 | Oami | G06V 40/10 |
| | | | 382/103 |

(Continued)

FOREIGN PATENT DOCUMENTS

| CN | 107730438 A | * | 2/2018 | |
| CN | 108717704 A | * | 10/2018 | ........... G06T 3/0018 |

(Continued)

OTHER PUBLICATIONS

International Search Report Issued in Intl. Appln. No. PCT/JP2020/008147 dated May 26, 2020. English translation provided.

(Continued)

*Primary Examiner* — Ian L Lemieux
*Assistant Examiner* — Woo C Rhim
(74) *Attorney, Agent, or Firm* — ROSSI, KIMMS & McDOWELL LLP

(57) ABSTRACT

An object tracking device includes a storage unit that stores in advance a reference for a movement amount of an object between frames for each position or area on a fisheye image, a determining unit that determines, based on a position of the object in a first frame image and the reference for a movement amount associated with the position of the object in the first frame image, a position of a search area in a second frame image subsequent to the first frame image, and a search unit that searches the search area in the second frame image for the object to specify a position of the object in the second frame image.

6 Claims, 11 Drawing Sheets

(51) Int. Cl.
 *G06T 3/00* (2006.01)
 *G06T 5/00* (2006.01)
(52) U.S. Cl.
 CPC .............. *G06T 2207/30196* (2013.01); *G06T 2207/30232* (2013.01)
(58) Field of Classification Search
 CPC .......... G06T 2207/20021; G06T 7/207; G06T 2207/30196; G06T 2207/30232; G06T 7/246; G06V 20/58; G06V 10/25; G06V 2201/07; H04N 23/00; H04N 23/60; H04N 7/18
 See application file for complete search history.

(56) References Cited

U.S. PATENT DOCUMENTS

| | | | | |
|---|---|---|---|---|
| 2015/0131851 | A1* | 5/2015 | Bernal | G06T 7/248 382/103 |
| 2016/0028951 | A1* | 1/2016 | Mayuzumi | G06V 40/20 348/36 |
| 2016/0073020 | A1* | 3/2016 | Matsumoto | G06T 3/0018 348/222.1 |
| 2016/0078311 | A1* | 3/2016 | Matsumoto | G06T 7/73 382/206 |
| 2017/0127008 | A1* | 5/2017 | Kankaanpää | H04N 21/42204 |
| 2017/0264832 | A1* | 9/2017 | Yoshizawa | H04N 23/667 |
| 2018/0181142 | A1* | 6/2018 | Baran | B60D 1/36 |
| 2018/0374200 | A1* | 12/2018 | Taoki | H04N 23/631 |
| 2019/0012766 | A1* | 1/2019 | Yoshimi | G06T 5/003 |
| 2019/0166299 | A1* | 5/2019 | Kitagawa | H04N 7/183 |
| 2019/0287212 | A1* | 9/2019 | Yanagisawa | H04N 23/61 |
| 2020/0007763 | A1* | 1/2020 | Takenaka | G06T 3/4038 |
| 2020/0242391 | A1* | 7/2020 | Takahashi | G06T 7/00 |
| 2020/0273205 | A1* | 8/2020 | Yamashita | H04N 17/002 |
| 2021/0248756 | A1* | 8/2021 | Sasaki | G06T 7/223 |
| 2021/0309149 | A1* | 10/2021 | Inagaki | H04N 7/183 |
| 2021/0326608 | A1* | 10/2021 | Yoshimi | G06V 20/58 |

FOREIGN PATENT DOCUMENTS

| | | | | |
|---|---|---|---|---|
| EP | 3093822 | A1 * | 11/2016 | G06T 7/20 |
| JP | 2014042160 | A * | 3/2014 | |
| JP | 2016039539 | A | 3/2016 | |
| JP | 2019009520 | A | 1/2019 | |
| JP | 2019036213 | A * | 3/2019 | |
| JP | 7028729 | B2 * | 3/2022 | |
| WO | 2013001941 | A1 | 1/2013 | |

OTHER PUBLICATIONS

Written Opinion Issued in Intl. Appln. No. PCT/JP2020/008147 dated May 26, 2020. English translation provided.

* cited by examiner

Fig. 8

Size table

|     |     |     |     |     |     |
| --- | --- | --- | --- | --- | --- |
| 1.5 | 1.8 | 2.0 | 2.0 | 1.8 | 1.5 |
| 1.8 | 2.0 | 2.5 | 2.5 | 2.0 | 1.8 |
| 2.0 | 2.5 | 3.0 | 3.0 | 2.5 | 2.0 |
| 2.0 | 2.5 | 3.0 | 3.0 | 2.5 | 2.0 |
| 1.8 | 2.0 | 2.5 | 2.5 | 2.0 | 1.8 |
| 1.5 | 1.8 | 2.0 | 2.0 | 1.8 | 1.5 |

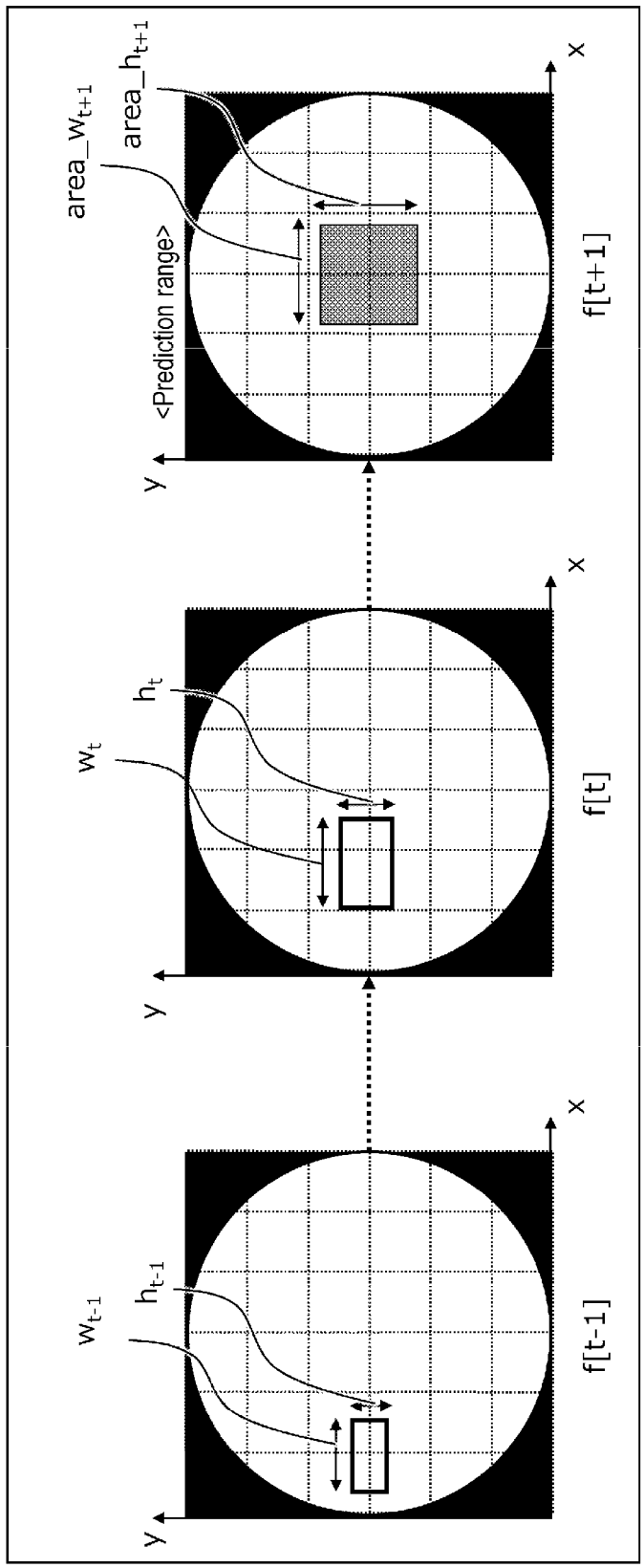

OBJECT TRACKING DEVICE AND OBJECT TRACKING METHOD

TECHNICAL FIELD

The present invention relates to a technique for tracking an object using an image taken by a fisheye camera.

BACKGROUND ART

The fields of building automation (BA) and factory automation (FA) require an application that automatically measures the "number", "position", "flow line", and the like of people using an image sensor and optimally controls equipment such as lighting or air conditioner. In such an application, in order to acquire image information on as large an area as possible, an ultra-wide-angle camera equipped with a fisheye lens (referred to as a fisheye camera, an omnidirectional camera, or a 360-degree camera, each of which being of the same type, and the term "fisheye camera" is used herein) is often used.

An image taken by such a fisheye camera is highly distorted. Therefore, in order to detect or track a human body, a face, or the like from the image taken by the fisheye camera (hereinafter referred to as a "fisheye image"), a method under which the fisheye image is developed in a plane in advance to eliminate distortion as much as possible and then subjected to the detection or tracking processing is commonly used (see Patent Document 1).

PRIOR ART DOCUMENT

Patent Document

Patent Document 1: Japanese Unexamined Patent Publication No. 2016-39539

SUMMARY OF THE INVENTION

Problems to be Solved by the Invention

The related art, however, has the following problems. One of the problems is an increase in overall processing cost due to the preprocessing of developing the fisheye image in a plane. This makes real-time processing difficult and may lead to delays in device control, which is not preferable. The other problem is a risk of false detection or tracking due to significant deformation or division, caused by processing during the plane development, of an image of a person or object existing at a boundary (image break) at the time of plane development such as directly below the fisheye camera.

In order to avoid the problems, the present inventors have studied an approach under which the fisheye image is subjected to the tracking processing as it is (that is, "without plane development"). The fisheye image, however, makes tracking difficult because a movement amount varies for each region of the image as compared with a normal camera image.

The present invention has been made in view of the above-described circumstances, and it is therefore an object of the present invention to provide a technique for tracking an object from a fisheye image at high speed and with high accuracy.

Means for Solving the Problem

The present invention employs the following configuration in order to achieve the above-described object.

Provided according to a first aspect of the present invention is an object tracking device that tracks an object present in a to-be-tracked area by using a fisheye image obtained by a fisheye camera installed above the to-be-tracked area, the object tracking device including a storage unit that stores in advance a reference for a movement amount of the object between frames for each position or area on the fisheye image, a determining unit configured to determine, based on a position of the object in a first frame image and the reference for a movement amount associated with the position of the object in the first frame image, a position of a search area in a second frame image subsequent to the first frame image, and a search unit configured to search the search area in the second frame image for the object to specify a position of the object in the second frame image.

The "fisheye camera" is a camera that is equipped with a fisheye lens and is capable of taking an image at an ultra-wide angle as compared with a normal camera. Examples of the fisheye camera include an omnidirectional camera and a 360-degree camera. The fisheye camera may be installed to be directed downward from above the to-be-tracked area. Typically, the fisheye camera is installed to have its optical axis directed vertically downward, but the optical axis of the fisheye camera may be inclined with respect to the vertical direction.

The present invention allows the tracking processing to be executed with high accuracy and at high speed by a method for determining the position of the search area with consideration given to the movement amount that varies in a manner that depends on the position of the object in the fisheye image. When the fisheye camera takes a bird's-eye image of the to-be-tracked area, an appearance (image) of an object significantly changes in a manner that depends on a positional relationship with the fisheye camera. Therefore, even when a to-be-tracked object moving at a constant speed is tracked, the movement amount of the to-be-tracked object in the fisheye image tends to vary in a manner that depends on the positional relationship with the fisheye camera. That is, the movement amount tends to be larger at the center of the fisheye image, and the closer to the edge of the fisheye image, the smaller the movement amount. The object tracking device determines, with consideration given to such a characteristic of the fisheye image, the search area that is located at a position suitable for tracking the to-be-tracked object in the subsequent frame. Further, the elimination of the need for preprocessing such as plane development of the fisheye image allows high-speed processing.

The storage unit may store in advance a reference for a size of the search area for each position or area on the fisheye image, and the determining unit may determine a size of the search area in the second frame image based on the position of the object in the first frame image and the reference for a size associated with the position of the object in the first frame image. In the fisheye image, the size of the object tends to vary in a manner that depends on the positional relationship with the fisheye camera. The object tracking device determines, with consideration given to such a characteristic of the fisheye image, the search area that has a size suitable for tracking the to-be-tracked object in the subsequent frame.

According to a second aspect of the present invention, provided is an object tracking device that tracks an object present in a to-be-tracked area by using a fisheye image obtained by a fisheye camera installed above the to-be-tracked area, the object tracking device including a storage unit that stores in advance a reference for a size of a search area for each position or area on the fisheye image, a determining unit configured to determine, based on a position of the object in a first frame image and the reference for a size associated with the position of the object in the first frame image, a size of the search area in a second frame image subsequent to the first frame image, and a search unit configured to search the search area in the second frame image for the object to specify a position of the object in the second frame image.

The present invention allows the tracking processing to be executed with high accuracy and at high speed by a method for determining the size of the search area with consideration given to the appearance (for example, the area) of the object that varies in a manner that depends on the position of the object in the fisheye image. When the fisheye camera takes a bird's-eye image of the to-be-tracked area, an appearance (image) of an object significantly changes in a manner that depends on a positional relationship with the fisheye camera. The size of the object appearing in the fisheye image is largest at the center of the fisheye image, and the closer to the edge of the fisheye image, the smaller the size. That is, the fisheye image has a characteristic by which the size (for example, the area) of the object changes in a manner that depends on a distance from the center of the image (the greater the distance, the smaller the size). The area of the object for each position or area on the fisheye image can be also geometrically calculated (predicted) based on the optical characteristics of the fisheye camera, the positional relationship between the fisheye camera 10 and the to-be-tracked area, and the like. The object tracking device determines, with consideration given to such a characteristic of the fisheye image, the search area that has a size suitable for tracking the to-be-tracked object in the subsequent frame. Further, the elimination of the need for preprocessing such as plane development of the fisheye image allows high-speed processing.

The reference for a size may be set such that the closer to the center of the fisheye image, the larger the size. As described above, the size of the object appearing in the fisheye image is largest at the center of the fisheye image, and the closer to the edge of the fisheye image, the smaller the size. The reference for a size may be set with consideration given to such a characteristic.

For example, the reference for a movement amount may be set such that the closer to the center of the fisheye image, the larger the movement amount. As described above, the movement amount tends to be larger at the center of the fisheye image, and the closer to the edge of the fisheye image, the smaller the movement amount. The reference for a movement amount may be set with consideration given to such a characteristic.

The determining unit may determine the position of the search area in the second frame image based on the position of the object in the first frame image, the reference for a movement amount associated with the position of the object in the first frame image, and a movement direction of the object. Determining the position of the search area based on the movement direction of the object in addition to the position of the object in the first frame image and the reference for a movement amount associated with the position allows the tracking processing to be executed with higher accuracy and at higher speed. That is, taking the movement direction into consideration makes it possible to narrow the search range, thereby allowing the search processing to be executed at high speed. Further, narrowing the search range makes it possible to reduce the possibility that an object other than the to-be-tracked object is present in the search area, thereby allowing the search processing to be executed with high accuracy.

The storage unit may store in advance a reference for a degree of distortion of an image for each position or area on the fisheye image, and the determining unit may determine the position of the search area in the second frame image based on the position of the object in the first frame image, the reference for a movement amount associated with the position of the object in the first frame image, the movement direction of the object, and the reference for a degree of distortion associated with the position of the object in the first frame image. As described above, since an actual fisheye image is distorted, when the to-be-tracked object moves in the horizontal direction above the center of the fisheye image, the to-be-tracked object moves along an arc curved upward in the fisheye image, for example. On the other hand, when the to-be-tracked object moves in the horizontal direction below the center of the fisheye image, the to-be-tracked object moves along an arc curved downward in the fisheye image, for example. Therefore, the object tracking device determines the search area that is located at a suitable position based on the distortion of the fisheye image so as to increase the speed and accuracy of the tracking processing.

The determining unit may determine a position of the search area in a direction identical to the movement direction of the object based on the position of the object in the first frame image, a position of the object in a frame image previous to the first frame image, and the reference for a movement amount, and determine a position of the search area in a direction orthogonal to the movement direction of the object based on the position of the search area in the direction identical to the movement direction of the object and the reference for a degree of distortion. The fisheye image is distorted in the direction orthogonal to the movement direction of the object. Therefore, determining the position in the direction orthogonal to the movement direction of the object based on the reference for a degree of distortion allows the position of the search area to be determined with high accuracy.

According to a third aspect of the present invention, provided is an object tracking method for tracking an object present in a to-be-tracked area by using a fisheye image obtained by a fisheye camera installed above the to-be-tracked area, the object tracking method including accessing a storage unit that stores in advance a reference for a movement amount of the object between frames for each position or area on the fisheye image to determine, based on a position of the object in a first frame image and the reference for a movement amount associated with the position of the object in the first frame image, a position of a search area in a second frame image subsequent to the first frame image, and searching the search area in the second frame image for the object to specify a position of the object in the second frame image.

According to a fourth aspect of the present invention, provided is an object tracking method for tracking an object present in a to-be-tracked area by using a fisheye image obtained by a fisheye camera installed above the to-be-tracked area, the object tracking method including accessing a storage unit that stores in advance a reference for a size of a search area for each position or area on the fisheye image to determine, based on a position of the object in a first frame image and the reference for a size associated with the position of the object in the first frame image, a size of the search area in a second frame image subsequent to the first frame image, and searching the search area in the second frame image for the object to specify a position of the object in the second frame image.

The present invention may be regarded as an object tracking device including at least some of the above-described units, a device that recognizes or detects a to-be-tracked object, an image processing device, or a monitoring system. Further, the present invention may be regarded as an object tracking method, an object recognizing method, an object detecting method, an image processing method, or a monitoring method, each of which including at least some of the above-described processing. Further, the present invention may be regarded as a program for implementing such a method or a non-transitory recording medium that records the program. It should be noted that the above-described units and processing may be combined with each other to an allowable degree to form the present invention.

Effect of the Invention

According to the present invention, an object can be tracked from a fisheye image at high speed and with high accuracy.

BRIEF DESCRIPTION OF THE DRAWINGS

FIG. 8 is a diagram showing an example of a size table.

FIG. 9 is a diagram showing an example of a range of a search area.

MODE FOR CARRYING OUT THE INVENTION

Application Example

Figure 1:
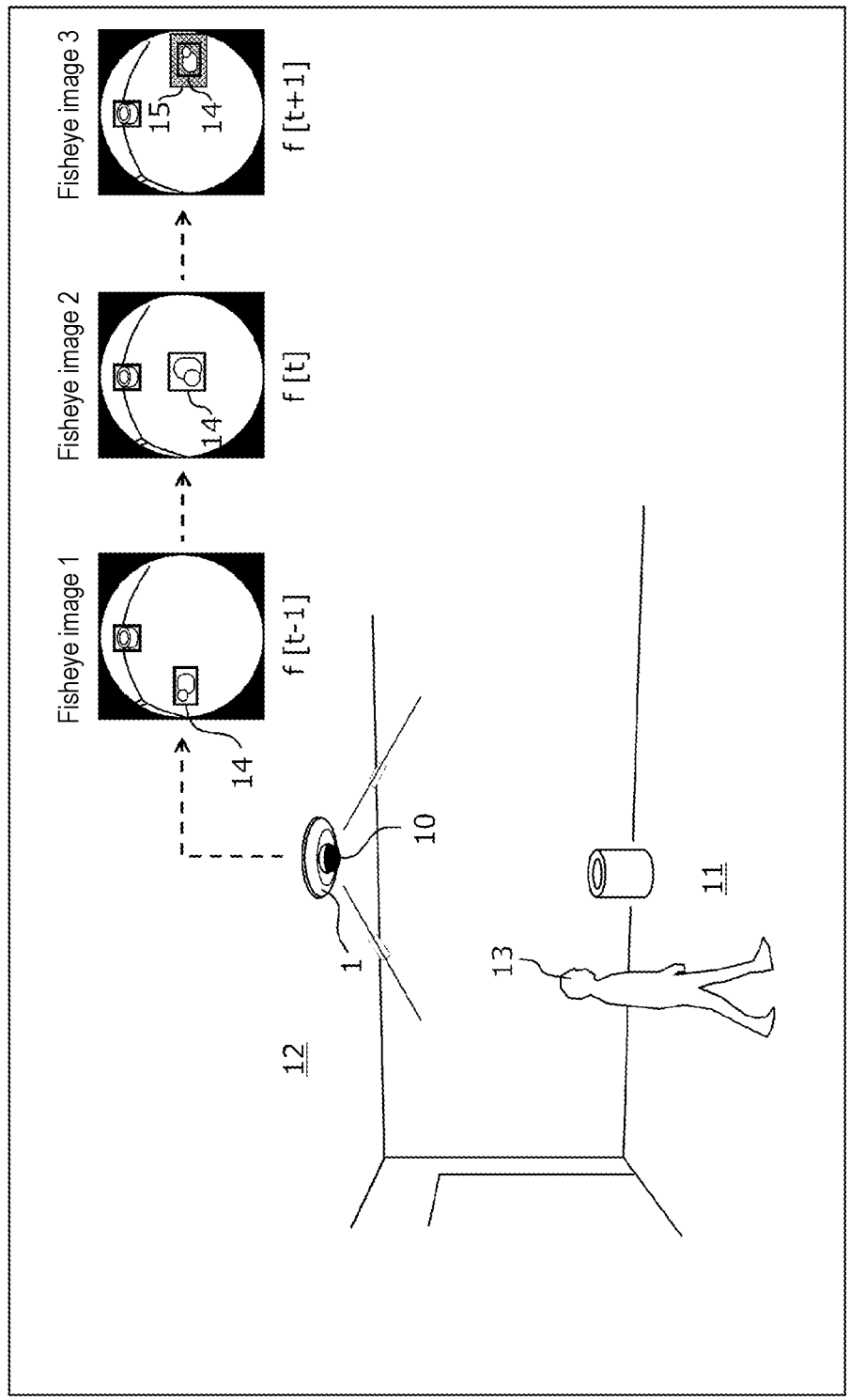
FIG. 1 is a diagram showing an application example of an object tracking device according to the present invention.

A description will be given of an application example of an object tracking device according to the present invention with reference to FIG. 1. An object tracking device 1 is a device that analyzes a fisheye image obtained by a fisheye camera 10 installed above a to-be-tracked area 11 (for example, a ceiling 12 or the like) and tracks an object 13 (for example, a person or the like) present in the to-be-tracked area 11. The object tracking device 1 detects, recognizes, and tracks the object 13 passing through the to-be-tracked area 11, for example, in an office or a factory. In the example shown in FIG. 1, to-be-tracked regions in fisheye images 1 to 3 are each represented by a bounding box 14 having a quadrilateral shape. The bounding box 14 is a closed figure or a frame line indicating the to-be-tracked region, and a figure such as a polygon or an ellipse surrounding the to-be-tracked region is used as the bounding box 14. The fisheye images 1 to 3 correspond to fisheye images in a frame f[t−1], a frame f[t] (first frame image), and a frame f[t+1] (second frame image), respectively. Further, in the fisheye image 3, a search area 15 that is a to-be-searched area in the frame f[t+1] is shown. The search area 15 is determined based on results from frames before the frame f[t+1]. A tracking result from the object tracking device 1 is output to an external device for use in, for example, counting the number of people, controlling various devices such as lighting and air conditioner, and keeping a suspicious person under observation.

When the fisheye camera 10 takes a bird's-eye image of the to-be-tracked area 11, an appearance (image) of a human body significantly changes in a manner that depends on a positional relationship with the fisheye camera 10. Therefore, even when a to-be-tracked object moving at a constant speed is tracked, the movement amount of the to-be-tracked object in the fisheye image tends to vary in a manner that depends on the positional relationship with the fisheye camera 10. That is, the movement amount tends to be larger at the center of the fisheye image, and the closer to the edge of the fisheye image, the smaller the movement amount. Further, the size of the human body tends to vary in a manner that depends on the positional relationship with the fisheye camera 10. The object tracking device 1 is characterized as being capable of determining, with consideration given to such a characteristic of the fisheye image, a search area suitable for tracking the to-be-tracked object in the next frame so as to increase the speed and accuracy of the tracking processing. The object tracking device 1 is further characterized as being capable of using the fisheye image as it is (that is, without preprocessing such as plane development or elimination of distortion) for object tracking processing.

<Characteristics of Fisheye Image>

Figure 2:
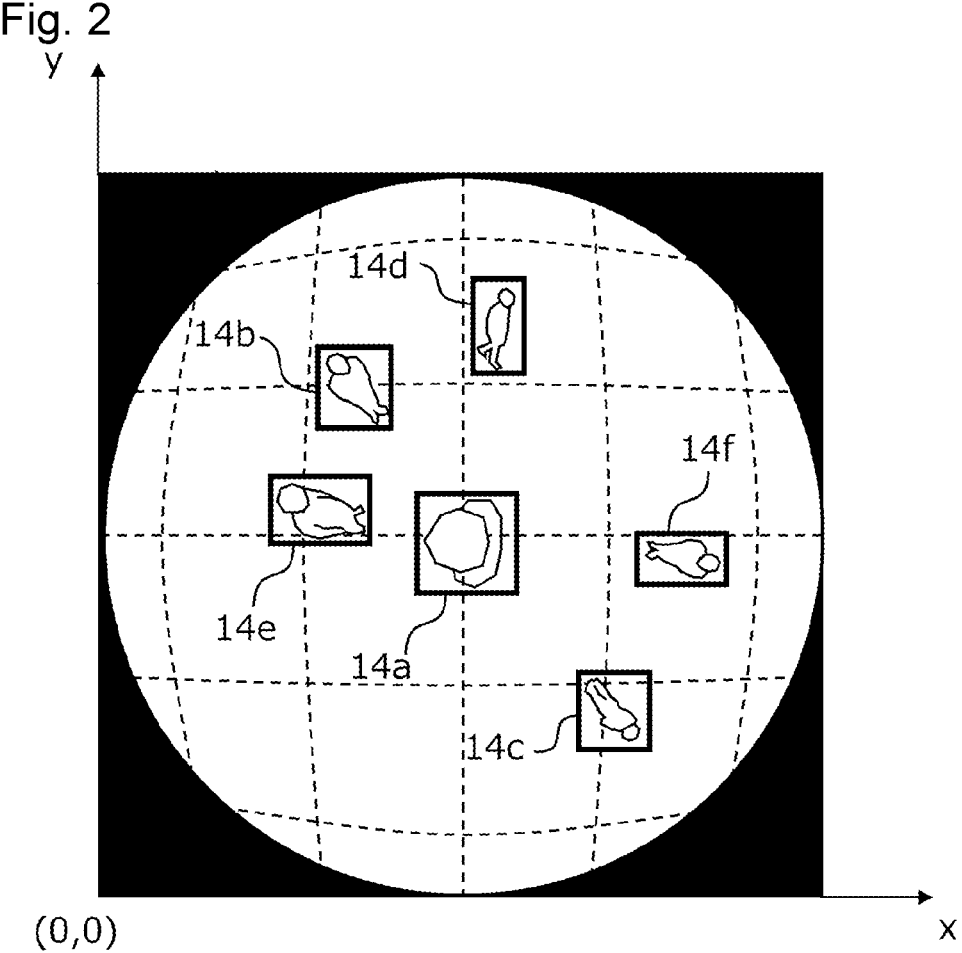
FIG. 2 is a diagram showing an example of a fisheye image and a bounding box.

FIG. 2 shows an example of the fisheye image captured from the fisheye camera 10. An image coordinate system has an origin (0,0) at a lower left corner of the fisheye image, an x-axis extending rightward along a horizontal direction, and a y-axis extending upward along a longitudinal direction.

When the fisheye camera 10 is installed to have its optical axis directed vertically downward, an image, in top view, of a person located directly below the fisheye camera 10 appears in a center of the fisheye image. Then, an angle of depression becomes smaller toward an edge of the fisheye image, and an image of the person appears in top oblique view. Further, a human body appearing in the fisheye image has its feet located near the center of the image and has its head located near the edge of the image, and is approximately parallel with a radial line passing through the center of the image. Further, the center of the fisheye image is less prone to distortion, and the closer to the edge of the fisheye image, the larger the image distortion. Therefore, even when the to-be-tracked object moves at a constant speed, the movement amount of the to-be-tracked object between frames of the fisheye image varies in a manner that depends on the position of the image.

Reference numerals 14a to 14f each denote a bounding box disposed to surround a region of the human body in the fisheye image. According to the embodiment, for convenience of image processing, a bounding box having a quadrilateral shape with four sides parallel to the x-axis or the y-axis is used.

Further, as shown in FIG. 2, the size of the human body appearing in the fisheye image is largest at the center of the fisheye image, and the closer to the edge of the fisheye image, the smaller the size of the human body. That is, the fisheye image has a characteristic by which the size (for example, the area) of the bounding box changes in a manner that depends on the distance from the center of the image (the greater the distance, the smaller the size). The area of the bounding box for each position or area on the fisheye image can be also geometrically calculated (predicted) based on the optical characteristics of the fisheye camera 10, the positional relationship between the fisheye camera 10 and the to-be-tracked area 11, and the average human body size.

First Embodiment

<Monitoring System>

Figure 3:
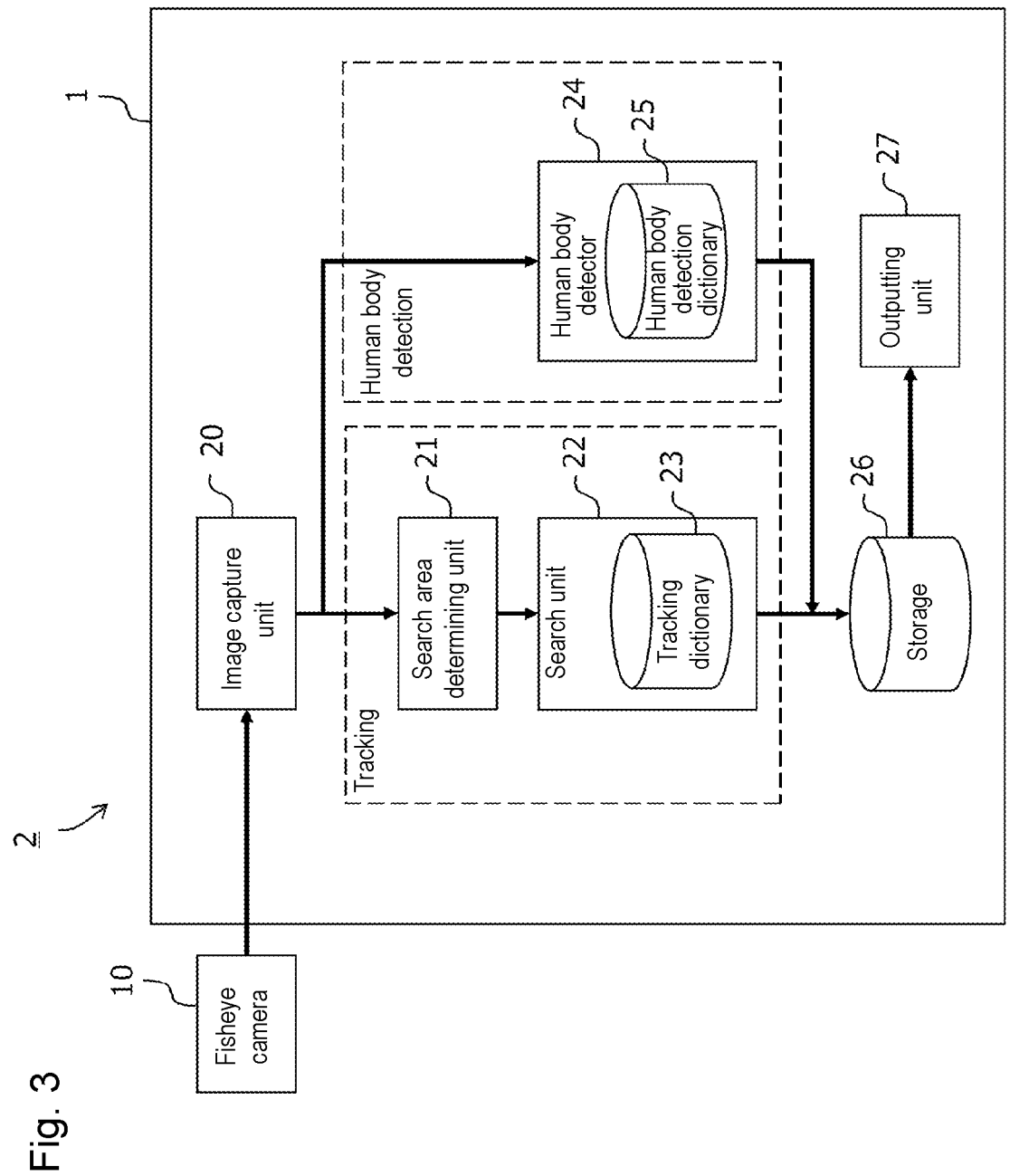
FIG. 3 is a diagram showing a structure of a monitoring system including the object tracking device.

A description will be given of the embodiment of the present invention with reference to FIG. 3. FIG. 3 is a block diagram showing a structure of a monitoring system to which the object tracking device according to the embodiment of the present invention is applied. A monitoring system 2 primarily includes the fisheye camera 10 and the object tracking device 1.

The fisheye camera 10 is an imaging device including an optical system with a fisheye lens and an imaging element (an image sensor such as a CCD or CMOS). For example, as shown in FIG. 1, the fisheye camera 10 may be installed on, for example, the ceiling 12 of the to-be-tracked area 11 with the optical axis directed vertically downward to take an omnidirectional (360-degree) image of the to-be-tracked area 11. The fisheye camera 10 is connected to the object tracking device 1 by wire (such as a USB cable or a LAN cable) or by radio (such as WiFi), and the object tracking device 1 captures image data taken by the fisheye camera 10. The image data may be either a monochrome image or a color image, and the resolution, frame rate, and format of the image data are determined as desired. According to the embodiment, it is assumed that a monochrome image captured at 10 fps (10 images per second) is used.

The object tracking device 1 according to the embodiment includes an image capture unit 20, a search area determining unit 21, a search unit 22, a human body detector 24, a storage 26, an outputting unit 27, and the like.

The image capture unit 20 has a capability of capturing the image data from the fisheye camera 10. The image data thus captured is passed to the search area determining unit 21 and the human body detector 24. This image data may be stored in the storage 26.

The search area determining unit 21 determines a search area that is an area to be searched for a to-be-tracked object. The search area is used for searching for and tracking a to-be-tracked object that has been detected once. The search unit 22 has a capability of searching for a to-be-tracked object from the fisheye image by using an algorithm for searching for a to-be-tracked object within the search area described above. A tracking dictionary 23 is a dictionary in which information on and features of tracking targets (to-be-tracked objects) are registered.

The human body detector 24 has a capability of detecting a human body or the like from the fisheye image by using an algorithm for detecting a human body. A human body detection dictionary 25 is a dictionary in which image features of human bodies appearing in the fisheye image are registered in advance.

The storage 26 has a capability of storing the fisheye image, the tracking result, and the like. The outputting unit 27 has a capability of outputting information such as the fisheye image or the tracking result to an external device. For example, the outputting unit 27 may display information on a display serving as the external device, transfer information to a computer serving as the external device, or send information or a control signal to a lighting device, an air conditioner, or an FA device serving as the external device.

The object tracking device 1 may be, for example, a computer including a CPU (processor), a memory, a storage, and the like. This causes the structure shown in FIG. 3 to be implemented by loading a program stored in the storage into the memory and executing the program by the CPU. Such a computer may be a general-purpose computer such as a personal computer, a server computer, a tablet terminal, or a smartphone, or alternatively, an embedded computer such as an onboard computer. Alternatively, all or part of the structure shown in FIG. 3 may be implemented by an ASIC, an FPGA, or the like. Alternatively, all or part of the structure shown in FIG. 3 may be implemented by cloud computing or distributed computing.

<Object Tracking Processing>

Figure 4:
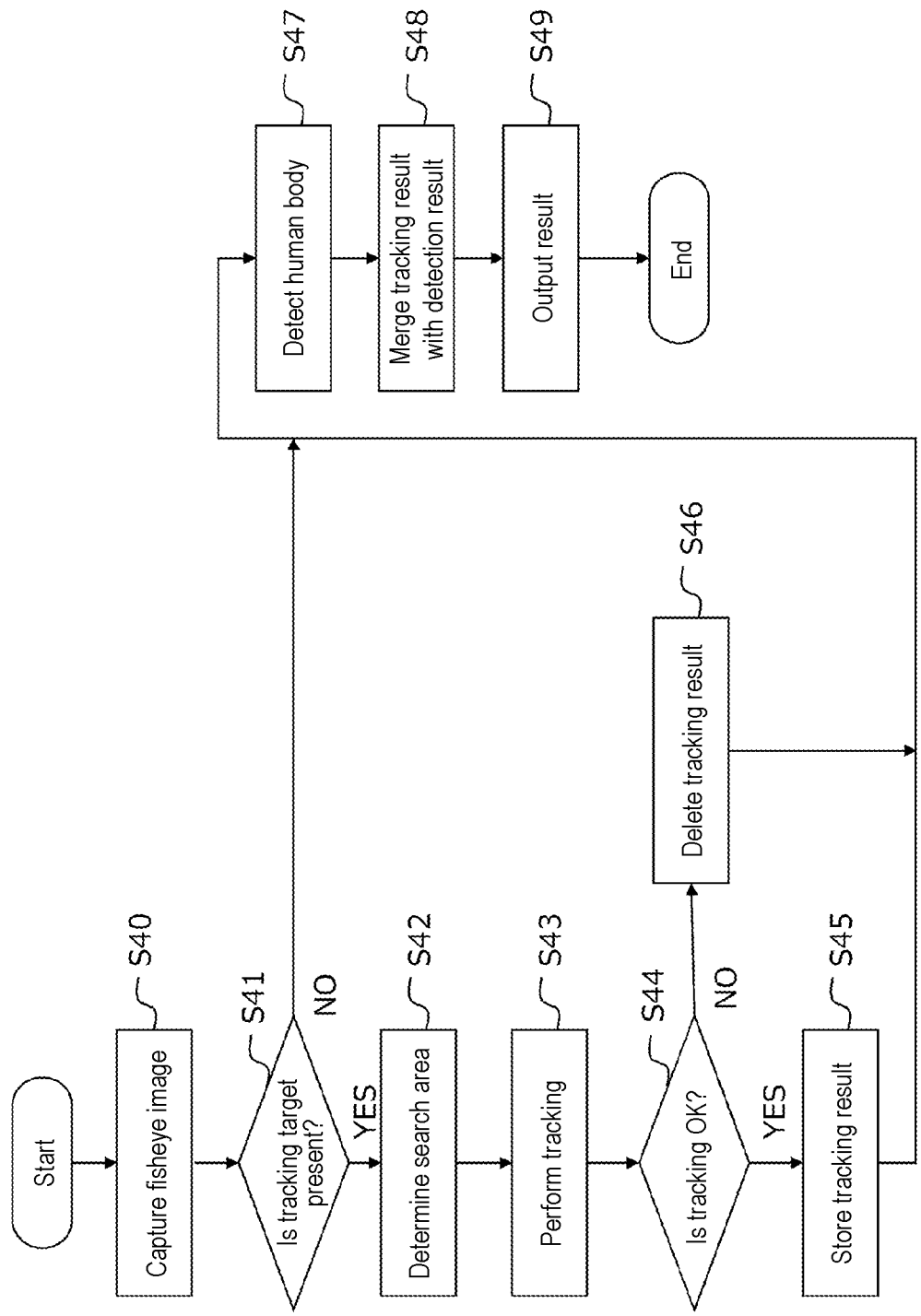
FIG. 4 is a flowchart of object tracking processing.

FIG. 4 is a flowchart of the object tracking processing to be executed by the monitoring system 2. A description will be given of an overall flow of the object tracking processing with reference to FIG. 4. Note that the flowchart shown in FIG. 4 shows processing on the fisheye image for one frame. When the fisheye image is captured at 10 fps, the processing shown in FIG. 4 is executed 10 times per second.

First, the image capture unit 20 captures the fisheye image for one frame from the fisheye camera 10 (step S40). As described in BACKGROUND ART, in the related art, a plane-developed image that results from eliminating distortion from the fisheye image is created, and then image processing such as tracking or recognition is executed, but the monitoring system 2 according to the embodiment executes tracking or recognition processing on the fisheye image left as it is (left distorted).

Next, the object tracking device 1 determines whether or not an object under tracking (referred to as a tracking target) is present (step S41). Herein, when a to-be-tracked object exists in any frame before the current frame, a determination is made that "tracking target is present". When the tracking target is present (Yes in S41), the search area determining unit 21 determines a search area in the next frame (step S42). Details of the processing of determining a search area will be described later. Then, the search unit 22 performs tracking by searching the search area for the to-be-tracked object (step S43).

Examples of the tracking method include a method for predicting a region to be tracked based on the degree of similarity in color feature or shape feature between frames. Specifically, an algorithm such as template matching, Mean-Shift, particle filter, or SURF Tracking may be used. According to the embodiment, the whole body of a person is treated as the to-be-tracked object, but the present invention is not limited to the configuration, and part of the body such as the upper body may be treated as the to-be-tracked object. Then, the search unit 22 determines whether or not the tracking target has been found (step S44). When the tracking target has been found (Yes in S44), the search unit 22 stores a tracking result in the storage 26 (step S45). When no tracking target has been found (No in S44), previous tracking results are deleted (step S46). Herein, examples of the case where no tracking target has been found include a case where the tracking target has moved out of the angle of view of the fisheye camera.

Next, the human body detector 24 detects a human body from the fisheye image (step S47). When a number of people exist in the fisheye image, a number of human bodies are detected. Further, in many cases, a non-human body object (such as an electric fan, a desk chair, or a coat rack that resembles a human body in shape or color) may be falsely detected. The detection result may contain, for example, information on the bounding box indicating a region such as a human body thus detected. The information on the bounding box may contain, for example, center coordinates (x, y) (corresponding to a position where the human body or the like is detected), a height h, and a width w of the bounding box. The detection result is stored in the storage 26. Note that, when no tracking target is present (No in S41), processing in and after step S47 is executed.

Note that any algorithm may be applied to the human body detection. For example, a classifier that is a combination of image features such as HoG or Haar-like and Boosting may be applied, or human body recognition based on deep learning (for example, R-CNN, Fast R-CNN, YOLO, SSD, or the like) may be applied. According to the embodiment, the whole body of a person is detected as a human body, but the present invention is not limited to such detection, and part of the body such as the upper body may be detected.

Next, the object tracking device 1 merges the tracking result with the detection result (step S48). The result thus merged is stored in the storage 26, for example. The reason why the detection processing is executed by the object tracking device 1 is because, when another object that is not a to-be-tracked object in or before the previous frame appears in the fisheye image, the object is assigned an identification number (ID) unique to each to-be-tracked object based on the detection processing so as to be treated as a tracking target in the next frame. Note that the detection processing in steps S47, S48 may be executed every several frames rather than every frame. Finally, the outputting unit 27 outputs the tracking result and the like to the external device (step S49). This is the end of the processing on the fisheye image for one frame.

In the object tracking processing according to the embodiment, the fisheye image is analyzed as it is, and an object is detected directly from the fisheye image. This eliminates the need for preprocessing such as the plane development of the fisheye image or the elimination of distortion from the fisheye image, which allows high-speed object tracking processing. Further, according to the embodiment, the search range is determined based on the positional relationship with the fisheye camera, which allows tracking to be made with high accuracy.

<Search Area Determination Processing (S42)>

A description will be given of a specific example of processing of determining a search area by the search area determining unit 21.

Figure 5:
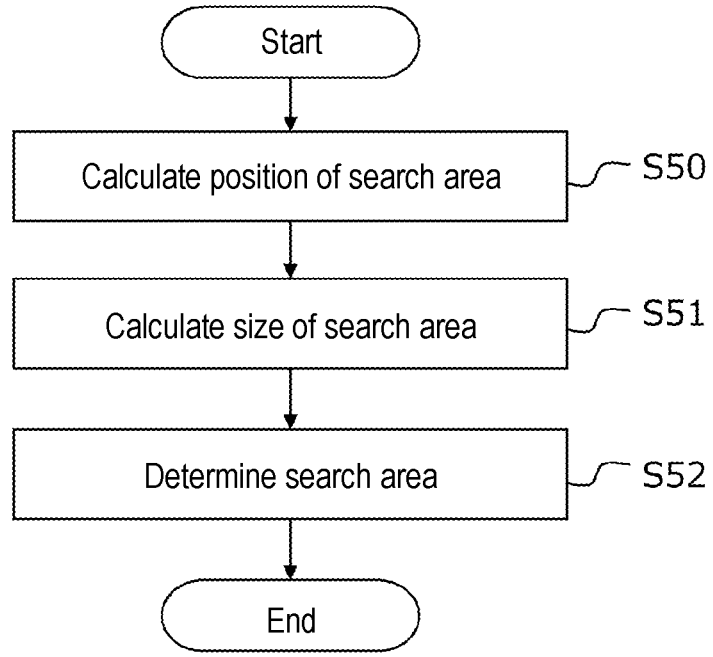
FIG. 5 is a flowchart of search area determination processing.

FIG. 5 is a flowchart of the search area determination processing. First, the search area determining unit 21 calculates a position of a search area (step S50). The position may be, for example, the center coordinates of the search area. Then, the search area determining unit 21 calculates a size of the search area (step S51). Finally, the search area determining unit 21 determines the search area based on the above-described position and size (step S52). Details of the processing in steps S50, S51 will be described.

(1) Processing of Calculating Position of Search Area (S50)

Figure 6:
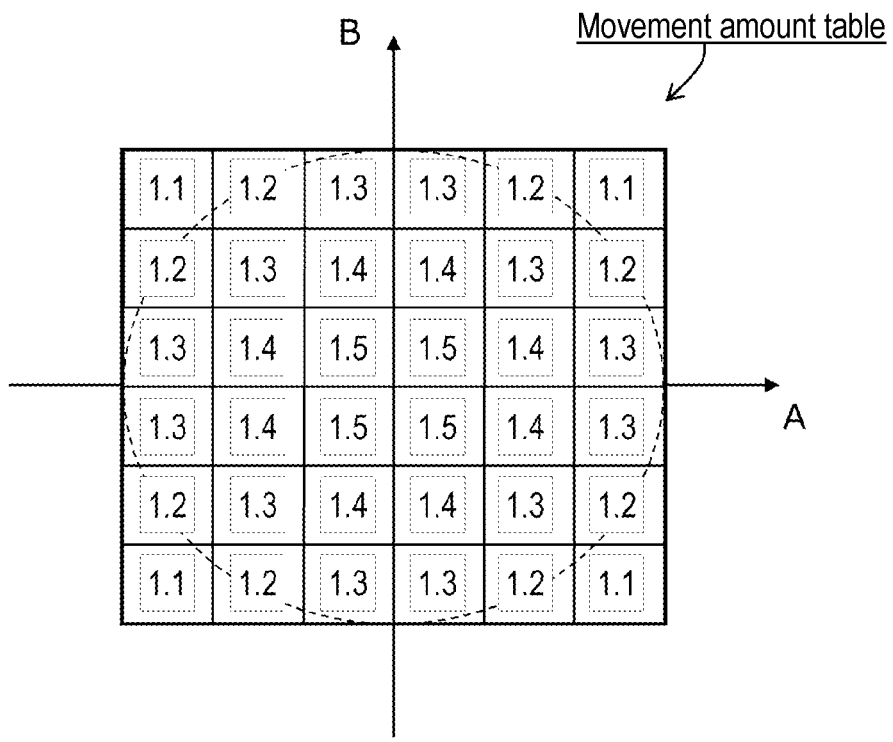
FIG. 6 is a diagram showing an example of a movement amount table.

As described above, the fisheye image has a characteristic by which the movement amount of the to-be-tracked object between frames changes in a manner that depends on the distance from the center of the image. This characteristic can be converted, by a calculation, into a numerical form in advance. FIG. 6 shows an example where the fisheye image is divided into 36 (6 by 6) small areas, and a reference value for a movement amount is calculated for each small area. A table where the reference value for a movement amount for each small area thus obtained is defined may be stored in the storage 26, for example. As shown in FIG. 6, on the assumption that an A-axis and a B-axis passing through the center of the image and parallel to the x-axis and the y-axis, respectively, are defined, the movement amount differs symmetrically about the A-axis and the B-axis. The use of this symmetry allows the storage 26 to store only, for example, a 3 by 3 table corresponding to one quadrant. This in turn allows a reduction in memory capacity.

A prediction position of the to-be-tracked object in the frame f[t+1] is calculated based on the movement amount table shown in FIG. 6, the position of the to-be-tracked object in the frame f[t−1], and the position of the to-be-tracked object in the frame f[t] (equation 1). According to the embodiment, the prediction position of the to-be-tracked object thus calculated is set as the position of the search area. In the equation 1, (x, y) denotes the position of the to-be-tracked object in each frame. The position (x, y) of the to-be-tracked object may be, for example, the center coordinates of the bounding box. Further, in the equation 1, α denotes a value determined based on the above-described movement amount table. For example, when the position (x, y) of the to-be-tracked object in the frame f[t] is near the center of the fisheye image, α is determined to be 1.5.

[Math. 1]

$$(x_{t+1}, y_{t+1}) = (x_t, y_t) + \alpha \times (x_t - x_{t-1}, y_t - y_{t-1}) \quad (1)$$

Figure 7:
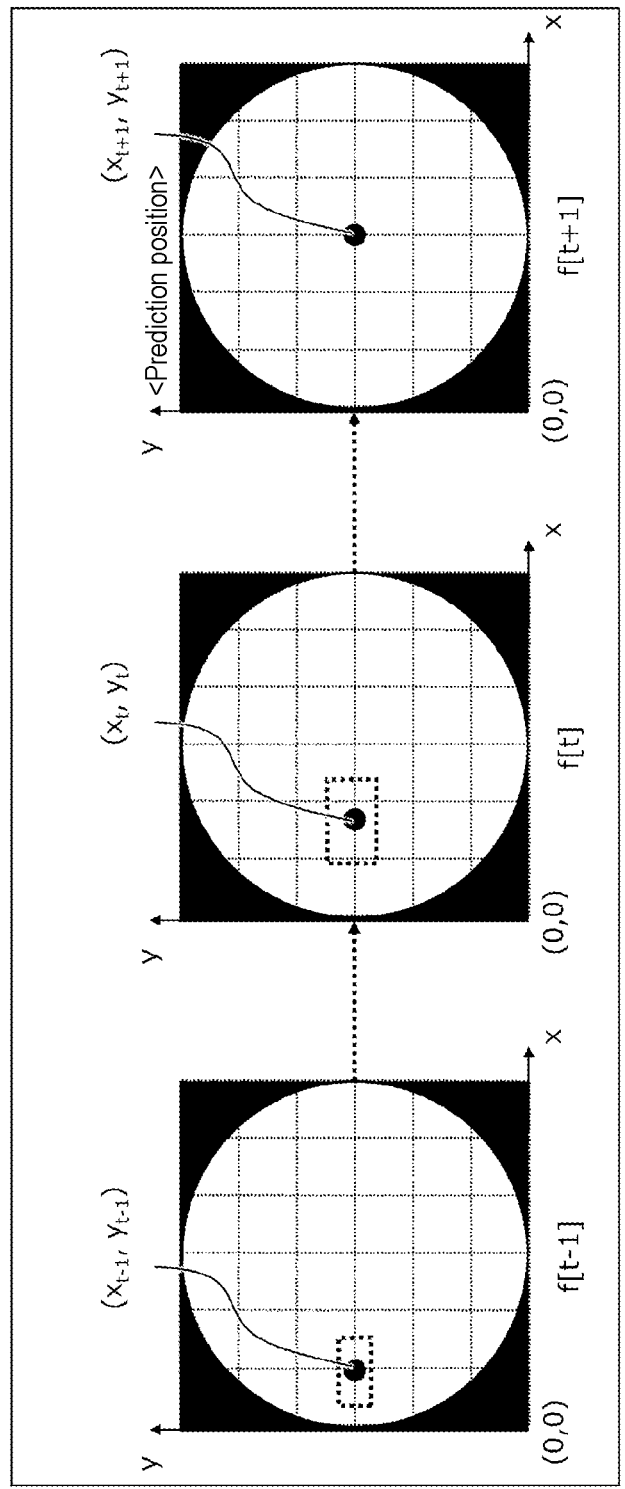
FIG. 7 is a diagram showing an example of a position of a search area.

FIG. 7 is a diagram showing an example of the position of the search area (the prediction position of the to-be-tracked object) calculated using the above-described equation 1. In the example shown in FIG. 7, α is determined to be 1.4 based on the position in the frame f[t] and the movement amount table shown in FIG. 6. The closer to the center of the fisheye image, the larger the movement amount of the to-be-tracked object; therefore, as shown in FIG. 7, the prediction position of the to-be-tracked object in the frame f[t+1] is obtained such that the movement amount between the frames f[t+1] and f[t] becomes larger than the movement amount between the frames f[t−1] and f[t].

(2) Processing of Calculating Size of Search Area (S51)

As described above, the fisheye image has a characteristic by which the area (size) of the bounding box changes in a manner that depends on the distance from the center of the image. This characteristic can be converted, by a calculation, into a numerical form in advance. FIG. 8 shows an example where the fisheye image is divided into 36 (6 by 6) small areas, and an area (number of pixels) of each small area is calculated. A table in which a reference value for a size (for example, an area) of each small area thus obtained is defined may be stored in the storage 26. As shown in FIG. 8, the reference value for a size differs symmetrically about the center of the image. The use of this symmetry allows storage 26 to store only, for example, a 3 by 3 table corresponding to one quadrant. This in turn allows a reduction in memory capacity.

The size of the search area in the frame f[t+1] is calculated based on the size table shown in FIG. 8 and the size of the bounding box in the frame f[t] (equation 2). In the equation 2, w and h respectively denote a horizontal size and vertical size of the bounding box corresponding to the to-be-tracked object in the frame f[t]. Further, area_w and area_h respectively denote a horizontal size and vertical size of the search area in the frame f[t+1]. Further, in the equation 2, β denotes a value determined based on the above-described size table. For example, when the coordinates (x, y) of the frame f[t] are near the center of the fisheye image, β is determined to be 3.0. Note that the size of the search area may be obtained, as with the equation 1, with consideration given to the size of the bounding box of the frame f[t−1].

[Math. 2]

$$(area\_w_{t+1}, area\_h_{t+1}) = \beta \times (w_c, h_t) \quad (2)$$

FIG. 9 is a diagram showing an example of the size of the search area calculated using the above-described equation 2. In the example shown in FIG. 9, β is determined to be 2.5 based on the position (for example, the center position of the bounding box) in the frame f[t] and the movement amount table shown in FIG. 8. The closer to the center of the fisheye image, the larger the size of the to-be-tracked object; therefore, the size of the search area in the frame f[t+1] is made larger. Note that β may be determined based on the position in the frame f[t+1] obtained by the above-described equation 1 and the movement amount table shown in FIG. 8.

<Advantageous Effects of Embodiment>

The monitoring system according to the embodiment determines, in the tracking processing using the fisheye camera, the search area based on the characteristics of the fisheye image so as to increase the speed and accuracy of the tracking processing.

Figure 10A:
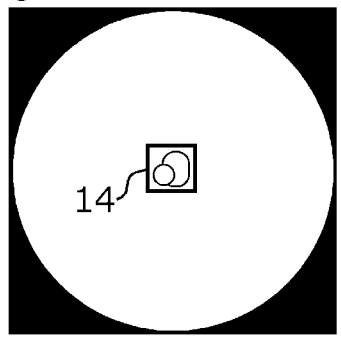
FIGS. 10A to 10F are diagrams showing an example of tracking processing under a method in the related art.
Figure 10B:
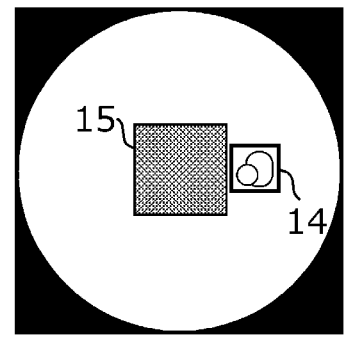
Figure 11A:
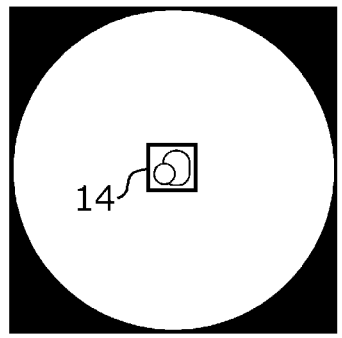
FIGS. 11A to 11F are diagrams showing an example of tracking processing under a method according to the present invention.
Figure 11B:
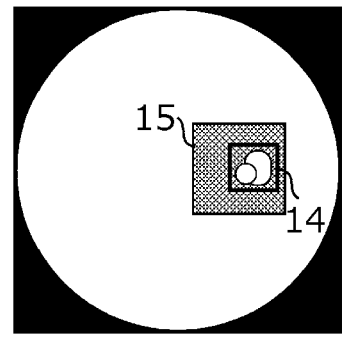

A description will be given of an example of increasing the accuracy. Under the method in the related art, no consideration is given to an increase or decrease in the movement amount for the to-be-tracked object located near the center of the fisheye image (FIG. 10A). Therefore, the to-be-tracked object may possibly move out of the search area 15 in the next frame (FIG. 10B). Under the method according to the present invention, the size of the search area 15 is made larger in consideration of an increase or decrease in the movement amount for the to-be-tracked object located near the center of the fisheye image (FIG. 11A). This reduces the possibility that the to-be-tracked object may move out of the search area 15 and thus allows tracking to be made with high accuracy (FIG. 11B).

Figure 10C:
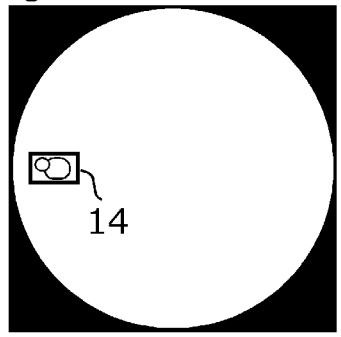
Figure 10D:
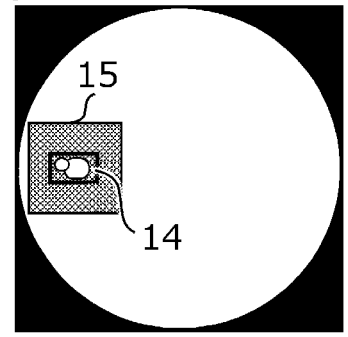
Figure 11C:
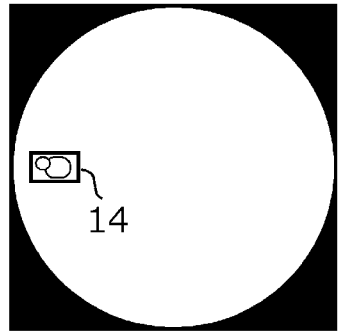
Figure 11D:
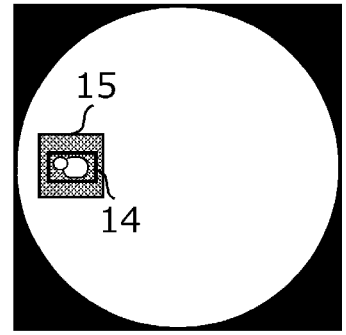

A description will be given of an example of increasing the speed. Under the method in the related art, no consideration is given to an increase or decrease in the size for the to-be-tracked object located away from the center of the fisheye image (FIG. 10C). Therefore, when a large search area 15 is provided even though the size of the bounding box corresponding to the to-be-tracked object is small in the next frame, the processing cost becomes higher than necessary (FIG. 10D). Under the method according to the present invention, the search processing (tracking processing) is executed on the search area 15 having a size determined based on the position for the to-be-tracked object located away from the center of the fisheye image (FIG. 11C). This allows the search processing to be efficiently executed and thus allows an increase in speed of the processing (FIG. 11D).

Figure 10E:
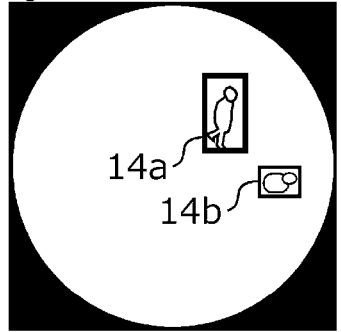
Figure 10F:
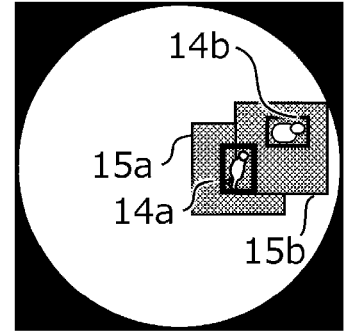
Figure 11E:
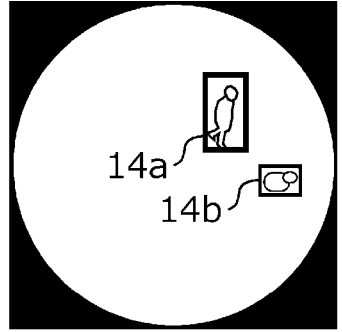
Figure 11F:
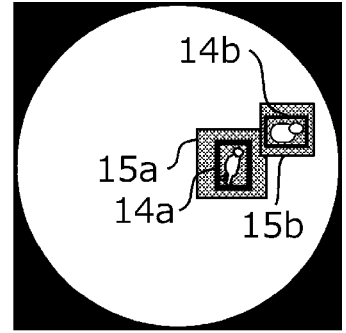

Further, a description will be given of an example where a plurality of to-be-tracked objects are present. Under the method in the related art, when a plurality of to-be-tracked objects are present at positions close to each other in the fisheye image (FIG. 10E), a search area 15*a* and a search area 15*b* for the plurality of to-be-tracked objects may possibly overlap each other in the next frame to cause the to-be-tracked objects to change places with each other (FIG. 10F). Under the method according to the present invention, even when a plurality of to-be-tracked object are present at positions close to each other in the fisheye image (FIG. 11E), the search area is suitably determined with consideration given to the prediction position and size of the to-be-tracked object in the next frame. This reduces the possibility that the search areas for to-be-tracked object may overlap each other and thus allows an increase in accuracy (FIG. 11F).

Second Embodiment

In the first embodiment described above, the method for obtaining the position of the search area on the assumption that, when the to-be-tracked object moves linearly, the to-be-tracked object in the fisheye image also moves linearly has been described. As described with reference to FIG. 2, the actual fisheye image, however, is distorted. Therefore, for example, when the to-be-tracked object moves in the horizontal direction above the center of the fisheye image, the to-be-tracked object moves along an arc curved upward in the fisheye image. On the other hand, when the to-be-tracked object moves in the horizontal direction below the center of the fisheye image, the to-be-tracked object moves along an arc curved downward in the fisheye image, for example. Therefore, according to the second embodiment, in the processing of calculating the position of the search area described above (S50), the position is calculated based on the distortion of the fisheye image. Note that the monitoring system according to the second embodiment is the same in structure as the monitoring system according to the first embodiment, and thus no description will be given of the structure of the monitoring system. Further, as for the processing executed in the monitoring system according to the second embodiment, only processing different from the processing according to the first embodiment will be described, and no description will be given of the same processing.

Figure 12:
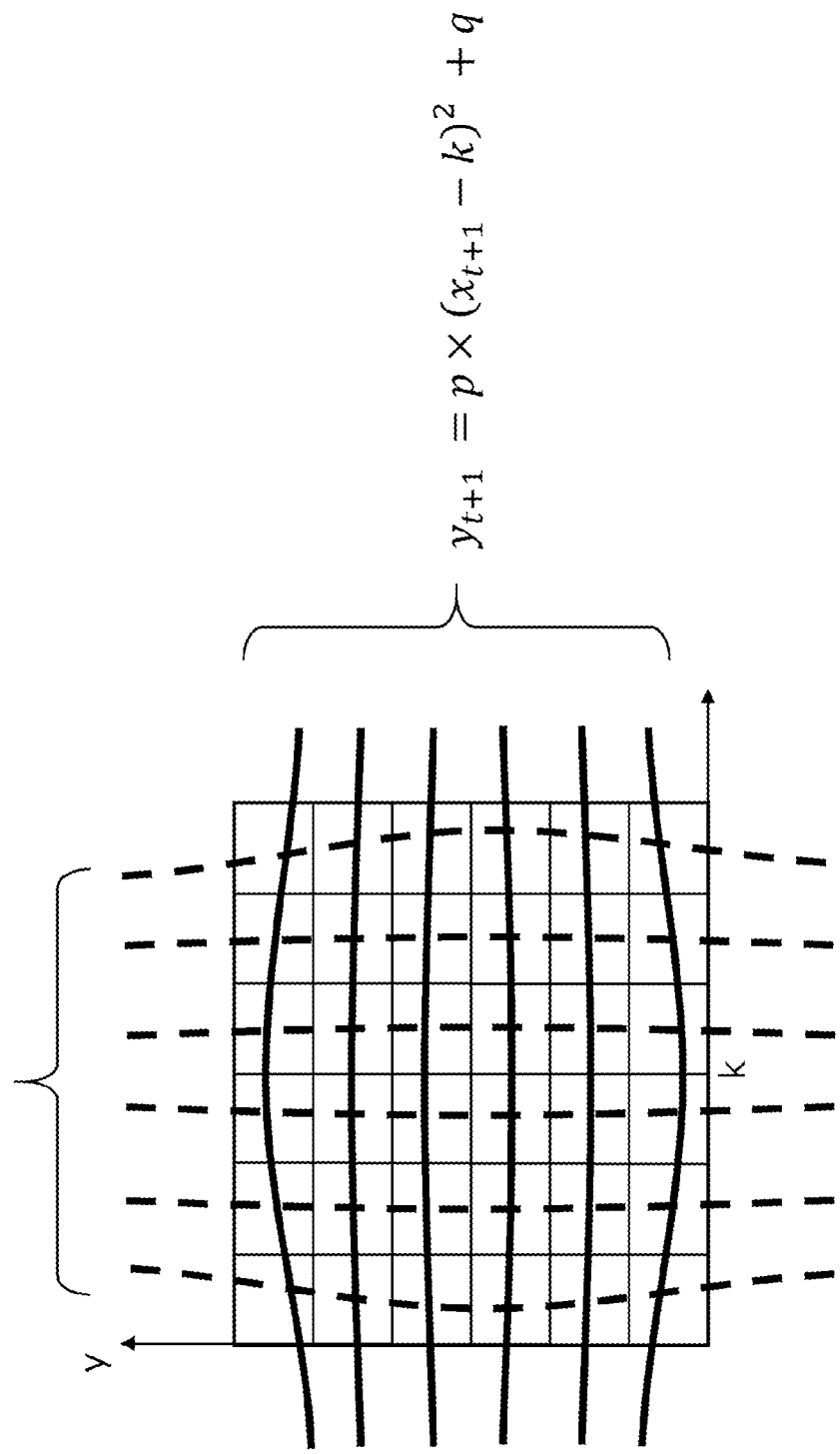
FIG. 12 is a diagram showing a degree of distortion of a fisheye image.

As described above, the fisheye image has a characteristic by which the degree of distortion changes in a manner that depends on the distance from the center of the image. This characteristic can be converted, by a calculation, into a numerical form in advance. A solid line shown in FIG. 12 represents an example where the fisheye image is divided into 36 (6 by 6) small areas, and the degree of distortion in the vertical direction for each small area is represented by a quadratic function. A dashed line shown in FIG. 12 represents an example where the degree of distortion in the horizontal direction for each small area is represented by a quadratic function.

As shown in FIG. 12, the further away in a direction orthogonal to the movement direction, the larger the degree of distortion. A vertical distortion table and a horizontal distortion table in which a reference for a degree of distortion for each small area thus obtained is defined may be stored in the storage 26, for example. The vertical distortion table and the horizontal distortion table can also be regarded as tables in which the degree of distortion in the direction orthogonal to the movement direction of the to-be-tracked object is defined. In practice, values of p and q (for example, p1, q1) corresponding to each small area may be stored in the vertical distortion table and the horizontal distortion table. Note that, as in the first embodiment, the vertical distortion table and the horizontal distortion table each show changes symmetrical about a corresponding axis. The use of this symmetry allows the storage 26 to store only, for example, a 3 by 3 table corresponding to one quadrant. This in turn allows a reduction in memory capacity.

Note that the degree of distortion according to the embodiment can also be regarded as a degree of distortion in the direction orthogonal to the movement direction. Specifically, the position of the search area in the same direction as the movement direction is obtained as in the first embodiment. Then, the position of the search area in the direction orthogonal to the movement direction may be determined based on the position of the search area in the movement direction and the reference value for a degree of distortion. Note that the reference value for a degree of distortion in a direction orthogonal to a predetermined direction may be used in determination of the position of the search area even when the object moves in any direction.

The prediction position of the to-be-tracked object in the frame f[t+1] is calculated based on the vertical distortion table and the horizontal distortion table, the position of the to-be-tracked object in the frame f[t−1], and the position of the to-be-tracked object in the frame f[t]. When the to-be-tracked object moves in the horizontal direction, a position x[t+1], in the horizontal direction, of the search area in the frame f[t+1] is obtained in the same manner as in the first embodiment. Then, a position y[t+1], in the vertical direction, of the search area in the frame f[t+1] is obtained based on the function associated with a corresponding small area (equation 3). Further, when the to-be-tracked object moves in the vertical direction, the position y[t+1], in the vertical direction, of the search area in the frame f[t+1] is obtained in the same manner as in the first embodiment. Then, the position x[t+1], in the horizontal direction, of the search area in the frame f[t+1] is obtained based on the function associated with a corresponding small area (equation 4). In the present processing, a quadratic function is used as an example, but any function that takes the degree of distortion of the fisheye image into consideration may be used.

[Math. 3]

$$\begin{cases} x_{t+1} = x_t + \alpha \times (x_t - x_{t-1}) \\ y_{t+1} = p \times (x_{t+1} - k)^2 + q \end{cases} \quad (3)$$

[Math. 4]

$$\begin{cases} x_{t+1} = p \times (y_{t+1} - k)^2 + q \\ y_{t+1} = y_t + \alpha \times (y_t - y_{t-1}) \end{cases} \quad (4)$$

(Others)

The above-described embodiments are merely illustrative of configuration examples according to the present invention. The present invention is not limited to the above-described specific forms, and various modifications may be made within the scope of the technical idea of the present invention. For example, the values in the tables shown in FIGS. 6 and 8, and the thresholds shown in the above-described embodiments are merely examples given for the description. Further, in the above-described embodiments, the bounding box having a quadrilateral shape has been given as an example, but a bounding box having a shape other than the quadrilateral shape (a polygon, an ellipse, a free-form figure, or the like) may be used.

Further, the position of the search area may be obtained based on the position of the object in the current frame, the reference value for a movement amount, and the movement direction of the object. Note that, in the above-described embodiments, the example where the movement direction is obtained based on the position of the object in the current frame and the position of the object in the frame before the current frame has been described, but the method for obtaining the movement direction is not limited to any specific method.

The position of the search area may be obtained based on the position of the object in the current frame and the reference value for a movement amount. As described above, the movement amount tends to be larger at the center of the fisheye image, and the closer to the edge of the fisheye image, the smaller the movement amount. This is because the search area can be determined, with consideration given to such a characteristic of the fisheye image, so as to be located at a position (may be regarded as a range) suitable for tracking the to-be-tracked object in the subsequent frame.

Furthermore, in the above-described embodiments, the example where the reference value for a movement amount and the reference value for a size associated with the position of the object are used in determination of the search area has been described, but the search area may be determined based on only either the reference value for a movement amount or the reference value for a size. For example, when the search area is made uniform in size, the search area is determined based on only the reference value for a movement amount described above. Further, for example, when the movement amount is made uniform, the search area is determined based on only the reference value for a size described above. Various methods may be used as the method for determining the position of the search area when the search area is determined based on only the reference value for a size. For example, the position of the search area may be determined based on the movement amount and movement direction of the to-be-tracked object in the frames f[t−1] and f[t], and the position of the to-be-tracked object in the frame f[t] may be used as the position of the search area.

Further, the search area may be made variable in shape based on an aspect ratio. This is because the aspect ratio of the object changes in a manner that depends on a change in angle of depression or azimuth when the object is viewed from the fisheye camera according to a position on the fisheye image. For example, a reference for an aspect ratio may be set to cause the search area to have an approximately square shape in a center area of the fisheye image and in an area located at an angle of 45 degrees with respect to the center area, to cause the search area to have a vertically long rectangular shape in upper and lower areas relative to the center area, and to cause the search area to have a horizontally long rectangular shape in left and right areas relative to the center area.

(Appendix 1)

(1) An object tracking device (1) that tracks an object (13) present in a to-be-tracked area (11) by using a fisheye image obtained by a fisheye camera (10) installed above the to-be-tracked area (11), the object tracking device (1) including a storage unit (26) that stores in advance a reference for a movement amount of the object (13) between frames for each position or area on the fisheye image, a determining unit (21) configured to determine, based on a position of the object (13) in a first frame image and the reference for a movement amount associated with the position of the object (13) in the first frame image, a position of a search area (15) in a second frame image subsequent to the first frame image, and a search unit (22) configured to search the search area (15) in the second frame image for the object (13) to specify a position of the object (13) in the second frame image.

(2) An object tracking device (1) that tracks an object (13) present in a to-be-tracked area (11) by using a fisheye image obtained by a fisheye camera (10) installed above the to-be-tracked area (11), the object tracking device (1) including a storage unit (26) that stores in advance a reference for a size of a search area (15) for each position or area on the fisheye image, a determining unit (21) configured to determine, based on a position of the object (13) in a first frame image and the reference for a size associated with the position of the object (13) in the first frame image, a size of the search area (15) in a second frame image subsequent to the first frame image, and a search unit (22) configured to search the search area (15) in the second frame image for the object (13) to specify a position of the object (13) in the second frame image.

(3) An object tracking method for tracking an object (13) present in a to-be-tracked area (11) by using a fisheye image obtained by a fisheye camera (10) installed above the to-be-tracked area (11), the object tracking method including accessing a storage unit (26) that stores in advance a reference for a movement amount of the object (13) between frames for each position or area on the fisheye image to determine, based on a position of the object (13) in a first frame image and the reference for a movement amount associated with the position of the object (13) in the first frame image, a position of a search area (15) in a second frame image subsequent to the first frame image (S42), and searching the search area (15) in the second frame image for the object (13) to specify a position of the object (13) in the second frame image (S43).

(4) An object tracking method for tracking an object (13) present in a to-be-tracked area (11) by using a fisheye image obtained by a fisheye camera (10) installed above the to-be-tracked area (11), the object tracking method including accessing a storage unit (26) that stores in advance a reference for a size of a search area (15) for each position or area on the fisheye image to determine, based on a position of the object (13) in a first frame image and the reference for a size associated with the position of the object (13) in the first frame image, a size of the search area (15) in a second frame image subsequent to the first frame image (S42), and searching the search area (15) in the second frame image for the object (13) to specify a position of the object (13) in the second frame image (S43).

DESCRIPTION OF SYMBOLS

1 object tracking device
2 monitoring system
10 fisheye camera
11 to-be-tracked area
12 ceiling
13 object

The invention claimed is:
1. An object tracking device that tracks an object present in a to-be-tracked area by using a fisheye image obtained by a fisheye camera installed above the to-be-tracked area, the object tracking device comprising:
   a storage storing in advance a reference for a movement amount of the object between frames for each position or area on the fisheye image;
   a processor executing a process that causes the object tracking device to:
   determine, based on a position of the object in a first frame image and the reference for a movement amount associated with the position of the object in the first frame image, a position of a search area in a second frame image subsequent to the first frame image; and
   search the search area in the second frame image for the object to specify a position of the object in the second frame image,
   wherein the storage stores in advance a reference for a degree of distortion of an image for each position or area on the fisheye image,
   wherein the position of the search area in the second frame image is determined based on the position of the object in the first frame image, the reference for a movement amount associated with the position of the object in the first frame image, a movement direction of the object, and the reference for a degree of distortion associated with the position of the object in the first frame image, and
   wherein a position of the search area in a direction identical to the movement direction of the object is determined based on the position of the object in the first frame image, a position of the object in a frame image previous to the first frame image, and the reference for a movement amount, and a position of the search area in a direction orthogonal to the movement direction of the object is determined based on the position of the search area in the direction identical to the movement direction of the object and the reference for a degree of distortion.

2. The object tracking device according to claim 1, wherein
   the storage stores in advance a reference for a size of the search area for each position or area on the fisheye image, and
   a size of the search area in the second frame image is determined based on the position of the object in the first frame image and the reference for a size associated with the position of the object in the first frame image.

3. The object tracking device according to claim 2, wherein
   the reference for a size is set such that the closer to a center of the fisheye image, the larger the size.

4. The object tracking device according to claim 1, wherein
   the reference for a movement amount is set such that the closer to a center of the fisheye image, the larger the movement amount.

5. An object tracking method for tracking an object present in a to-be-tracked area by using a fisheye image obtained by a fisheye camera installed above the to-be-tracked area, the object tracking method comprising:
   accessing a storage storing in advance a reference for a movement amount of the object between frames for each position or area on the fisheye image;
   determining, based on a position of the object in a first frame image and the reference for a movement amount associated with the position of the object in the first frame image, a position of a search area in a second frame image subsequent to the first frame image; and searching the search area in the second frame image for the object to specify a position of the object in the second frame image, wherein the storage stores in advance a reference for a degree of distortion of an image for each position or area on the fisheye image, wherein the determining includes determining the position of the search area in the second frame image based on the position of the object in the first frame image, the reference for a movement amount associated with the position of the object in the first frame image, a movement direction of the object, and the reference for a degree of distortion associated with the position of the object in the first frame image, and wherein the determining includes determining a position of the search area in a direction identical to the movement direction of the object based on the position of the object in the first frame image, a position of the object in a frame image previous to the first frame image, and the reference for a movement amount, and determines a position of the search area in a direction orthogonal to the movement direction of the object based on the position of the search area in the direction identical to the movement direction of the object and the reference for a degree of distortion.

6. A non-transitory computer readable medium storing a program for causing a computer to execute each step of the object tracking method according to claim 5.

* * * * *